(12) United States Patent
Swingley

(10) Patent No.: US 11,585,477 B1
(45) Date of Patent: Feb. 21, 2023

(54) SWEEP ELBOW PIPE CONNECTOR WITH OPTIMIZED FLOW PATH

(71) Applicant: Douglas Swingley, Sylmar, CA (US)

(72) Inventor: Douglas Swingley, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 784 days.

(21) Appl. No.: 16/389,963

(22) Filed: Apr. 21, 2019

(51) Int. Cl.
*F16L 43/00* (2006.01)
*F15D 1/04* (2006.01)

(52) U.S. Cl.
CPC .............. *F16L 43/008* (2013.01); *F15D 1/04* (2013.01)

(58) Field of Classification Search
CPC ................................ F16L 43/00; F16L 43/008
USPC ......................................................... 285/179
See application file for complete search history.

(56) References Cited

U.S. PATENT DOCUMENTS

| | | | | |
|---|---|---|---|---|
| 2,303,949 A | * | 12/1942 | Carlh | F16L 43/001 285/179 |
| 3,995,888 A | * | 12/1976 | McIlroy | F16L 43/008 285/179 |
| 4,606,556 A | * | 8/1986 | Metzger | 285/179 |
| 5,984,374 A | * | 11/1999 | Esser | F16L 43/001 285/179 |
| 6,951,354 B1 | * | 10/2005 | Paulson | F16L 43/001 285/179 |
| 2009/0261579 A1 | * | 10/2009 | Spears | F16L 43/008 285/179 |

* cited by examiner

*Primary Examiner* — Zachary T Dragicevich
(74) *Attorney, Agent, or Firm* — Irell and Manella LLP

(57) ABSTRACT

An arcuate sweep elbow pipe connector section is disclosed as part of the piping system used to deliver water from a source to a fire sprinkler head. The arcuate sweep elbow pipe connector section is integrally formed at one end with a first connecting section and integrally formed at a section end with a second connection section. The connecting sections are positioned ninety degrees relative to each other and the arcuate sweep elbow pipe connector section optimizes water flow through both connecting sections.

10 Claims, 5 Drawing Sheets

SWEEP ELBOW PIPE CONNECTOR WITH OPTIMIZED FLOW PATH

BACKGROUND OF THE INVENTION

1. Field of the Invention

The present invention relates to the field of water flow pipes used to facilitate the rapid flow of water to fire sprinklers to enable a fire inside a structure to be rapidly extinguished.

2. Background

Pipe connections to convey the flow of water from a source of water to a fire sprinkler head have traditionally included at least one connection joint that is angled to convey water in a desired direction. The current design of these connections frequently includes a ninety degree elbow connection which causes a large amount of head loss or energy loss based on the current and preferred design of these ninety-degree elbow connections.

In the design of fire sprinkler piping systems, water flow is of primary concern, The flow rate of the fire sprinkler heads are used to determine the size and pressure of the piping system required to deliver the required flow. These fire sprinkler systems frequently contain numerous fittings, 90 degree elbows being one of the most common. The measure of the restriction of a fitting is the length of pipe of the same size it represents in the system. These equivalent lengths are added to the total length of pipe to calculate the total pressure drop of the piping system. Reducing the equivalent length of a fitting can make the difference between the size of the pipe required and/or the amount of pressure that needs to be supplied either by incoming pipe size or the size of pumps required. There is a great economic advantage to decreasing the equivalent length of 90 degree elbows used in fire sprinkler systems.

In general, pipe fittings to deliver the water have sharp corners and reduced lengths to facilitate plumbing around corners and fitting within compact spaces resulting in the previous use of sharp cornered ninety-degree elbows incorporated between the pipes.

Therefore, there is a significant need for an improved elbow to replace conventional ninety-degree elbows and which includes improved flow characteristics to allow less head loss or energy loss as occurs for a ninety-degree pipe connection.

SUMMARY OF THE INVENTION

The present invention is an improved sweep elbow pipe connector having an increased flow capacity. The present invention is a replacement for conventional ninety-degree elbows as part of the piping system used to deliver water from a source to a fire sprinkler head. When a fire starts, seconds count and increased water flow to extinguish a fire will save property and lives.

Pipe connectors used for plumbing and the delivery of water or other fluids are not new or novel. Fittings used for drain, waste, and vent plumbing are predominantly a sweep pattern. Fittings used to convey fluids containing solids are frequently swept design. Changes in the direction of a pipe is frequently accomplished by bending the pipe producing a sweeping arc. Some fittings are commercially available that are constructed of bent pipe to produce a sweep.

Sweep fittings are produced by a number of processes that determine how the internal passage is constructed defining a shape. Metal sweeps are commonly centrifugally cast where a mold is filled with molten metal then rotated to deposit the freezing metal in an even layer inside the mold. Fittings cast in this manner have an internal geometry that is determined by the shape of the mold for the exterior of the fitting providing little limit on the shape and or size of the sweep body itself.

Metal sweep fittings are also cast using sand or other heat resistant granular material for the mold. The shape and size of the interior of the sweep portion of these cast fittings is determined by the size and shape of the sand used to "core out" the fitting. Because the sand can be removed as grains, the shape of the core in sand casting can be such that as cast it could not be removed from the finished fitting without crumbling the sand. This manufacturing process allows for an enlarged portion of the fitting in the sweep area that reduces the restriction of the fitting.

The bending process is a common method for generating sweep shapes from rigid pipes. The process of bending the pipe generates an interior shape that resembles the interior of the unbent pipe. Sometimes springs, elastomeric plugs, low-melt metal alloys, and sand is used to prevent the pipe from collapsing and altering the shape of the inner diameter. Pipe is frequently heated to a temperature below the melting point to facilitate bending. Heated plastic pipe can be supported on the interior by pressurizing the interior of the pipe with compressed air or other fluid. All of these processes allow for the shape of the inner diameter of the sweep portion of the fitting to be larger than the ends.

It is an object of the present invention to provide an improved sweep elbow pipe connector to provide an optimum flow path for water when a connection is required to connect two standard pipes which are set ninety degrees to each other. The present invention is an innovative design for a sweep elbow pipe connector manufactured by the injection molding process. The injection molding process uses pressures up to 20,000 psi requiring substantial, rigid, tooling that must be removed from the interior of the finished sweep all in one piece. The injection molding process is the preferred method of manufacturing plastic pipe fittings due to the precision, speed and economy of the method.

It is a further object of the present invention to provide a connecting sweep elbow pipe connector that provides increased flow capacity between the two fire sprinkler pipes by increasing the cross-sectional surface area of the interior of the pipe through a unique core geometry.

It is an additional object of the present invention to provide a 90 degree elbow fitting to connect two plastic pipes using solvent cement to create a pipe and fitting system that optimizes the flow area while maintaining constrained dimensions. Using the unique geometry of the interior of the sweep elbow pipe connector fitting, the cross sectional area or "waterway" of the fitting are as large as the tooling method allows.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
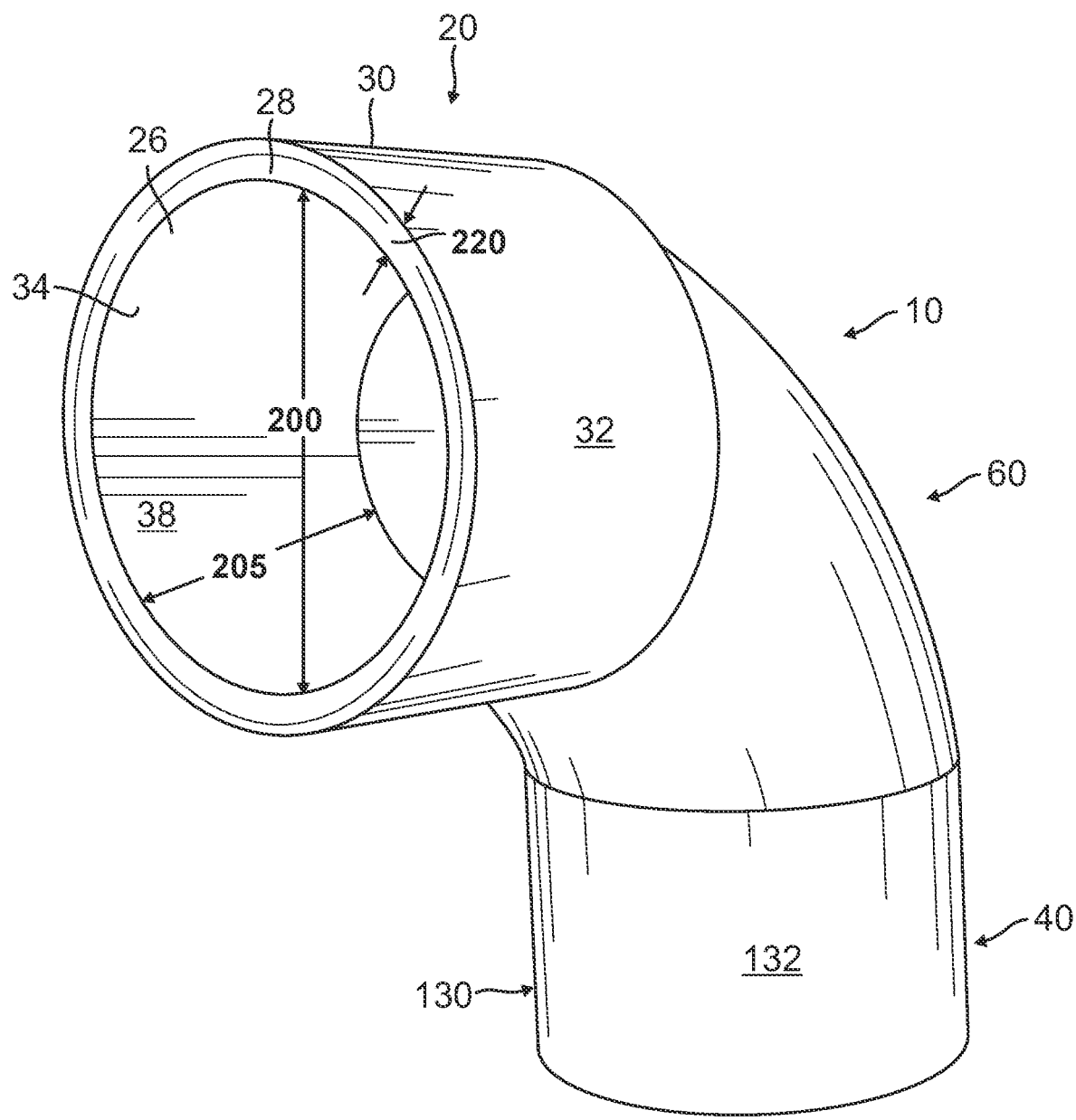
FIG. 1 is a vertical front and side perspective view of the present invention sweep elbow pipe connector with optimized flow path integrally formed at opposite ends with a first pipe connecting section and a second pipe connecting section.
Figure 2:
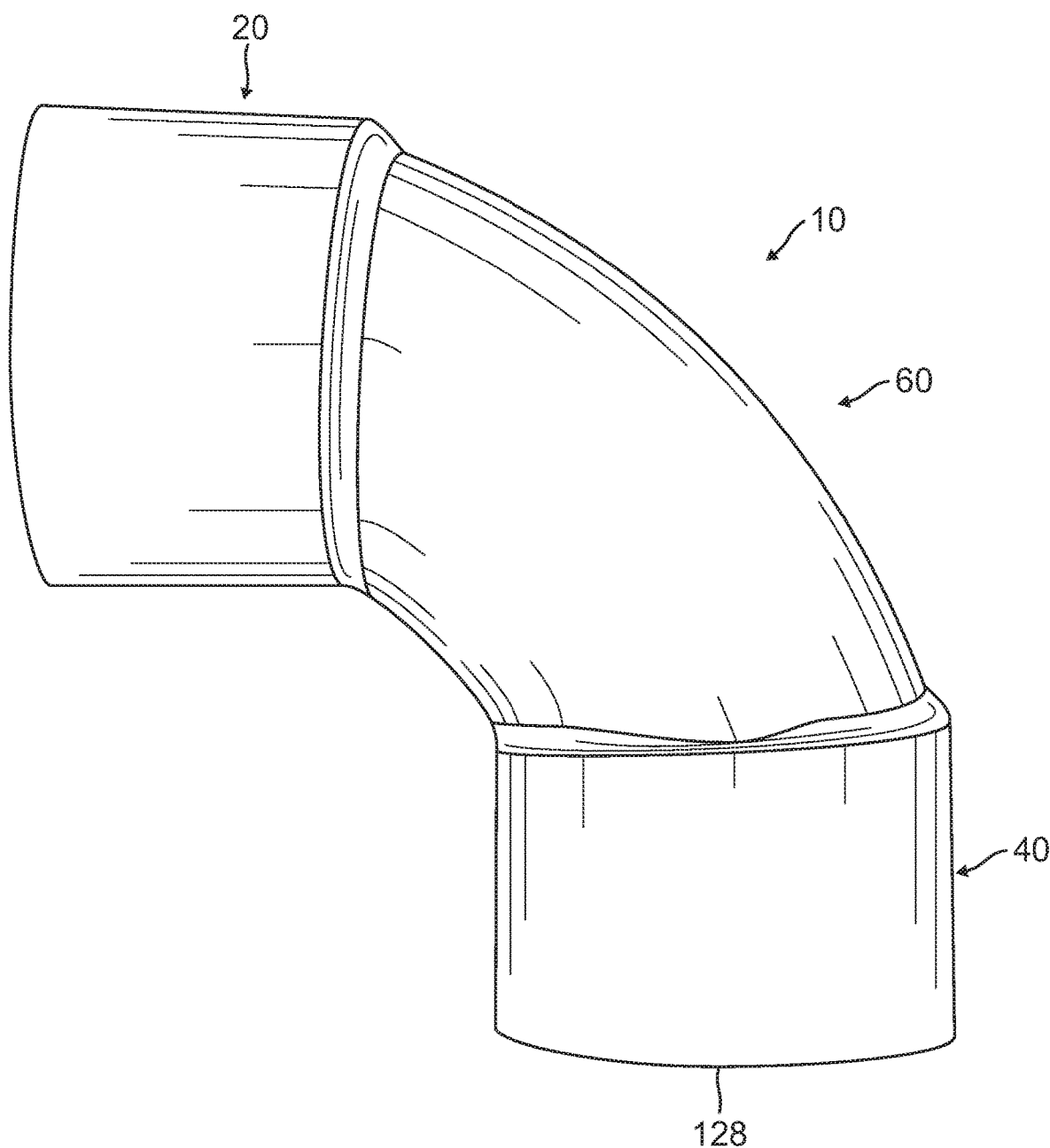
FIG. 2 is a vertical side perspective view of the present invention sweep elbow pipe connector with optimized flow path integrally formed at opposite ends with a first pipe connecting section and a second pipe connecting section.

Referring to FIG. 1, there is illustrated a vertical front and side perspective view of the present invention sweep elbow pipe connector with optimized flow path integrally formed at opposite ends with a first pipe connecting section and a second pipe connecting section. Referring to FIG. 2, there is illustrated a vertical side perspective view of the present invention sweep elbow pipe connector with optimized flow path integrally formed at opposite ends with a first pipe connecting section and a second pipe connecting section. The sweep elbow pipe connector is also referred to as "arcuate sweep elbow pipe connector" or "sweep elbow pipe connector section".

Figure 3:
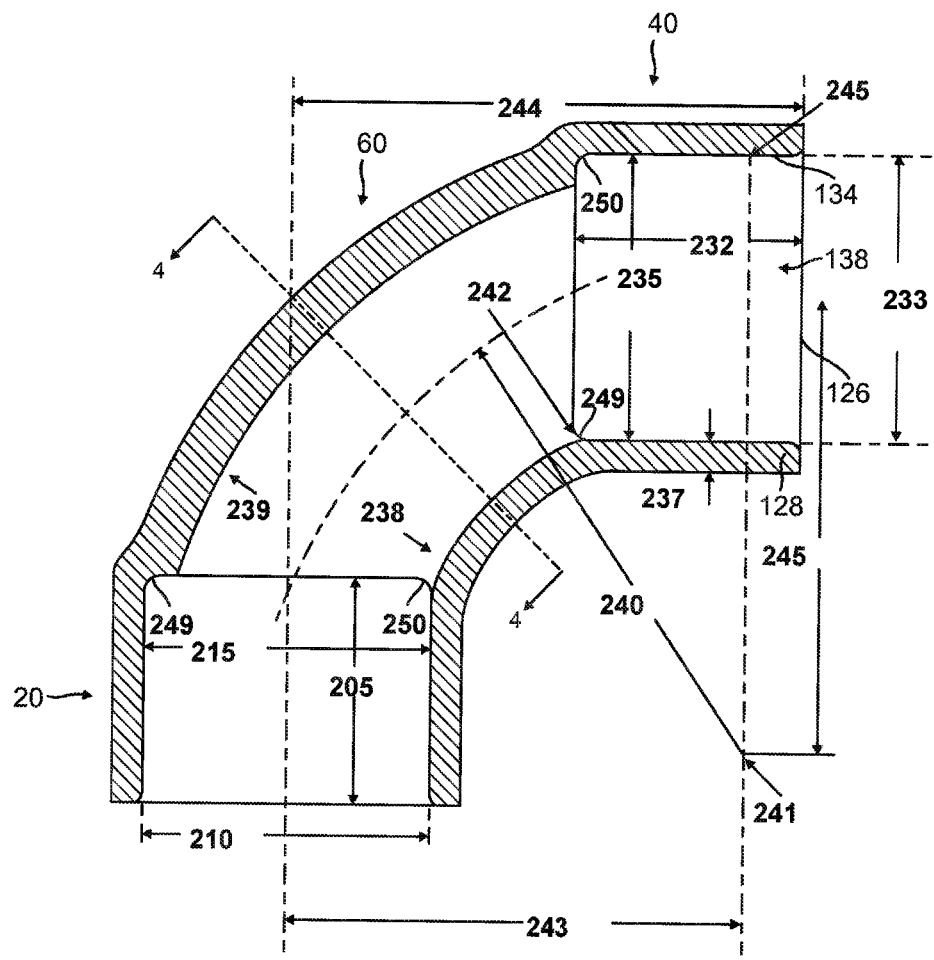
FIG. 3 is an interior longitudinal cross-sectional view of the present invention sweep elbow pipe connector with optimized flow path integrally formed at opposite ends with a first pipe connecting section and a second pipe connecting section, illustrating optimal dimensions and radii for flow path optimization.
Figure 4:
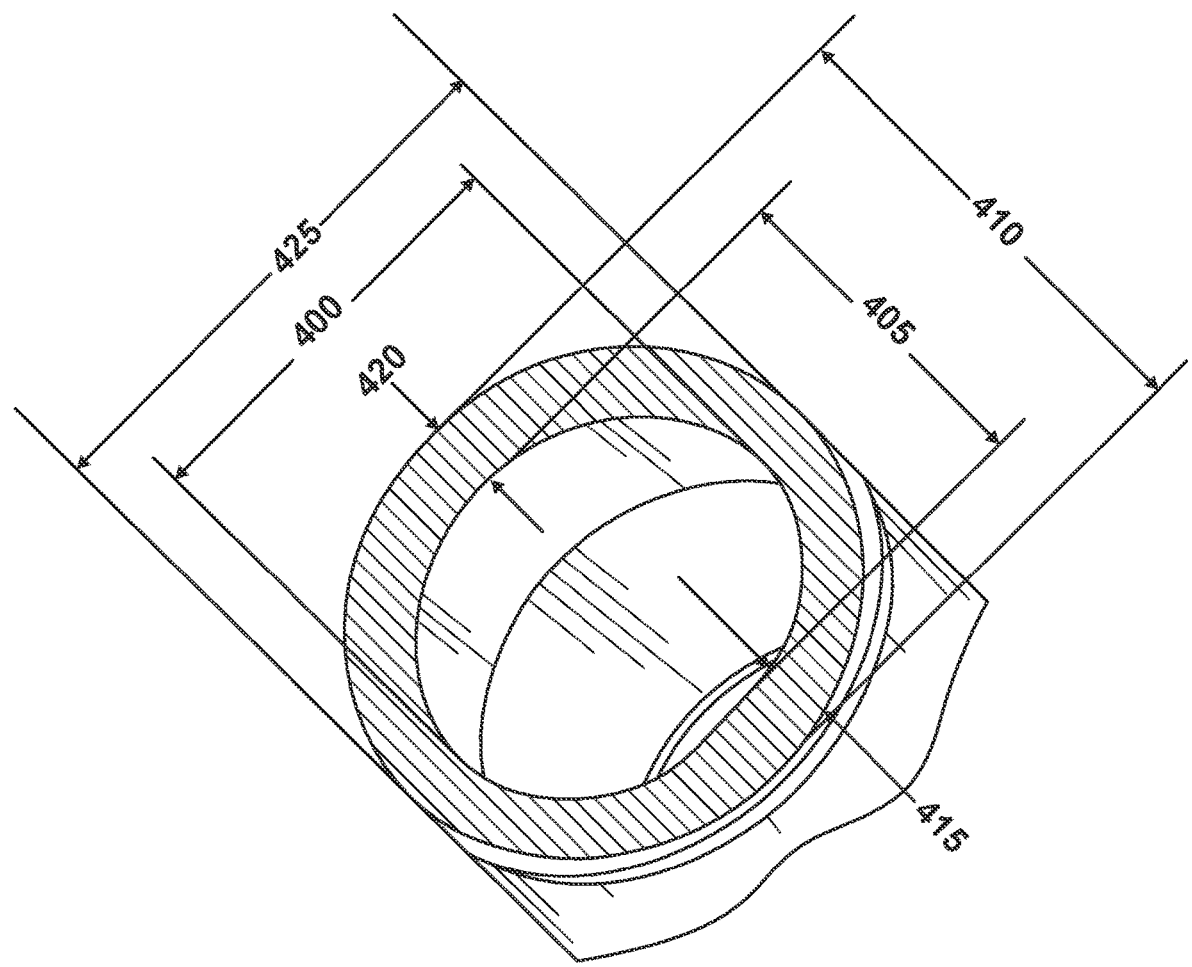
FIG. 4 is a cross-sectional view taken along line 4-4 of FIG. 3.

Referring to FIG. 3, there is illustrated is an interior longitudinal cross-sectional view of the present invention sweep elbow pipe connector with optimized flow path integrally formed at opposite ends with a first pipe connecting section and a second pipe connecting section, illustrating optimal dimensions and radii for flow path optimization. Referring to FIG. 4, there is illustrated a cross-sectional view taken along line 4-4 of FIG. 3.

Referring to FIGS. 1 through 3, the present invention sweep elbow pipe connector assembly 10 is a pipe connector including a first connecting section 20, a second connecting section 40, and an intermediate arcuate sweep elbow pipe connector section 60 integrally connecting the first connecting section 20, and the second connecting section 40. Said first connecting section 20 further includes a cylindrical wall 30 having an exterior surface 32 and an interior truncated cone surface 34 surrounding a first interior connecting chamber 38 having a tapered interior diameter 200 ("CDI-1"), including 210 ("CDIA-1)" at the entrance and 215 ("CDIB-1") at the bottom (see FIG. 3) and an interior length 205 ("CIL-I"). The first connecting section 20 further includes a first opening edge 28 encircling the first opening 26 leading to first connecting chamber 38. By way of example, chamber 38 is a truncated cone with the larger exterior diameter "CDIA-1" of approximately 1.325 inches and a smaller interior diameter "CDIB-1" of approximately 1.310 inches and a leading wall thickness 220 ("TLD-I") of at least 0.133 inches. The chamber interior length "CIL-1" is approximately 1.05 inches. The dimensions of the first connecting section are set by certified standard requirements to accommodate a connecting pipe as part of the water transport system to convey water under pressure from a source of water to a sprinkler head.

The second connecting section 40 is a duplicate of the first connecting section 20 but second connecting section is ninety degrees relative to first connecting section 20. The second connecting section 40 further includes a cylindrical wall 130 having an exterior surface 132 and an interior surface 134 surrounding a second interior connecting chamber 138 having a larger exterior diameter 233 ("CDIA-2") and a smaller interior diameter 235 ("CDIB-2") and an interior length 232 ("CIL-2"). The second connecting section 40 further includes a second opening edge 128 encircling the second opening 126 leading to second interior connecting chamber 138. By way of example, second interior connecting chamber 138 has a larger exterior diameter "CDIA-2" of approximately 1.325 inches and a smaller interior diameter "CDIB-2" of approximately 1.310 inches and a trailing wall thickness 237 ("TLD-2") of at least 0.133 inches. The second chamber interior length "CIL-2" is approximately 1.05 inches. The dimensions of the second connecting section 40 are set by certified standard requirements to accommodate a connecting pipe as part of the water transport system to convey water under pressure from a source of water to a sprinkler head.

The connecting sections 20 and 40 are configured to interference-fit receive fire sprinkler pipes having an outer diameter and length as required by fire sprinkler pipe standards to create a solvent cement assembly.

Referring again to FIG. 3, there is illustrated an interior longitudinal cross-sectional view of the present invention sweep elbow pipe connector assembly 10 including arcuate sweep elbow pipe connector section 60 with optimized flow path, illustrating optimal dimensions and radii for flow path optimization. Referring to FIG. 4, there is illustrated a cross-sectional view of the arcuate sweep elbow pipe connector section 60, taken along line 4-4 of FIG. 3.

The innovation of the present invention is the center section 60 which is the arcuate sweep elbow pipe connector section. The arcuate sweep elbow pipe connector section 60 is integrally formed at one end with first connecting section 20 and integrally formed at a second end with second connecting section 40. A key innovation of the present invention is to create a flow path which connects the first connecting section 20 to the second connecting section 40 set ninety degrees apart which optimizes the flow of water between connecting sections 20 and 40 and replaces a sharp cornered elbow connection which creates a slowdown of the water. Referring to FIGS. 3 and 4, the present invention sweep elbow pipe connector assembly 10 and in particular arcuate sweep elbow pipe connector section 60 creates an optimal flow path connection through modifying the interior diameter and sweep elbow pipe connector radius relative to the connection sections 20 and 40 as follows.

Referring to FIG. 3 the sweep elbow pipe connector section is defined longitudinally by the inside arc 238

("ARCI"), the outside arc 239 ("ARCO") and the center arc 240 ("ENSWEFR-3") all of which share the same Center-Point 241 ("POINTREF1"). Inside arc ARCI is calculated as the distance from the sweep center POINTREF1 and POINTREF2 (242) which is the intersection of the inside arc ARCI and the centerline edge of the truncated cone defined by CDIB-2. Inside arc ARCI can be calculated as:

ARCI=SQRT(((CNFR-1)−(LLEN-2)+(CIL-2))2+((CNFR-2)−((CDIB-2)/2))2).

For example with CIL-2=1.050 inches, CNFR-1 (243) =2.125 inches, LLEN-2 (244)=2.360 inches, CNFR-2 (245) =2.125 inches, and CDIB-2=1.310 inches ARCI=1.681 inches.

Outside arc ARCO is calculated as the distance from the sweep center POINTREF1 and POINTREF3 (245) which is a point at the intersection of a line through POINTREF1 and parallel to the second opening edge 128 and the centerline edge of the truncated cone defined by CDIB-2 and CDIA-2. Outside arc ARCO can be calculated as ARCO=(((CDIA-2)/2)−((CDIB-2)/2))*(((CNFR-1)−(LLEN-2)+(CIL-2))/(CIL-2)))+(CNFR-2)+((CDIB-2)/2).

For example with CDIA-2=1.325 inches, CDIB-2=1.310 inches, CNFR-1=2.125 inches, CIL-2=1.050 inches, LLEN-2=2.360 inches and CNFR-2=2.125 inches ARCO=2.786 inches.

Clearly ARCI and ARCO could be no large without having to pass through the part that is molded. Likewise the width of the sweep core cannot exceed the width of the opening. The width of the core SWETD-1 (400) can be calculated as the chord length of the second opening edge 128 a distance above center calculated as ENSWER-3 minus CNFR-2.

SWETD-1=(2)*(SQRT(((CDIA-2)/2)2)−(((ENSWER-3)−(CNFR-2))2)).

For example with CDIA-2=1.325 inches, ENSWER-3=2.270 inches and CNFR-2=2.125 inches SWETD-1=1.293 inches.

The interior longitudinal direction diameter SWELD-1 (405) can be calculated as the difference between the outside arc ARCO and the inside arc ARCI.

SWELD-1=ARCO−ARCI in this example SWELD-1=2.786−1.681=1.105 inches.

Outside dimensions of the novel sweep elbow pipe connector are determined by the wall section of the fitting. There are standards for wall sections of fittings used for pressurized fluids. One of the most common standards is "Schedule" fittings and pipe. With a range of schedules exceeding Schedule 10 through Schedule 160 this sweep is Schedule 40. Schedule 40 plastic fittings are represented by ASTM Standard D2466 where a 1" fitting has a minimum wall section of 0.166" and a minimum socket wall TLD-1 and TLD-2 of 80% of the minimum body wall. Referring to FIG. 4, therefore the outside dimensions of the example of the sweep elbow pipe connector section 60 is determined to be a minimum of
SWELD-2 (410)=SWELD-1+0.332 inches
and illustrated as SWELWT-1 (415) and
SWETD-2 (425)=SWETD-1+0.332 inches
illustrated as SWETWT-1 (420). In this example, SWELD-2=1.437 inches minimum and
SWETD-2=1.625 inches minimum.

The interior diameters of the arcuate sweep elbow pipe connector section 60 is reduced at the intersection of each end of the arcuate sweep elbow pipe connector section 60 and a respective connecting section 20 and 40 by an increased wall thickness of the arcuate sweep elbow pipe connector section 60 due to a varying radius 249 ("VR1") and 250 ("VR2") At the transition point from connecting section to arcuate sweep elbow pipe connector section, the interior diameter from connecting section to arcuate sweep elbow pipe connector section is reduced by a variable radius of 0 to 1/16 inch. The arcuate sweep elbow pipe connector has a greater wall thickness than the wall thickness of each respective connecting section to reduce the interior flow diameter from each connecting section of 1.315 inches to arcuate sweep elbow section interior diameters of 1.105 inches and 1.293 inches as previously discussed.

The sweep radius is determined by the lay-length of the fitting which determines the cut lengths of the pipes and the distance the joined pipes bust be spaced from a wall to provide clearance for the sweep elbow pipe connector. These sweep fittings are largely scalable so the lay length, radius and center can be roughly derived from the pipe OD.

Lay Length LLEN2=1.264*OD+0.698,

Radius ENSWEFR-3=0.943*OD+1.029 and

Center CNFR-1=CNFR-2=0.967*OD+0.853.

In this example, 1" IPS size pipe is 1.315" OD so LLen2-2.36, ENSWEFR-3=2.270 and CNFR-1=CNFR-2=2.125.

Figure 5:
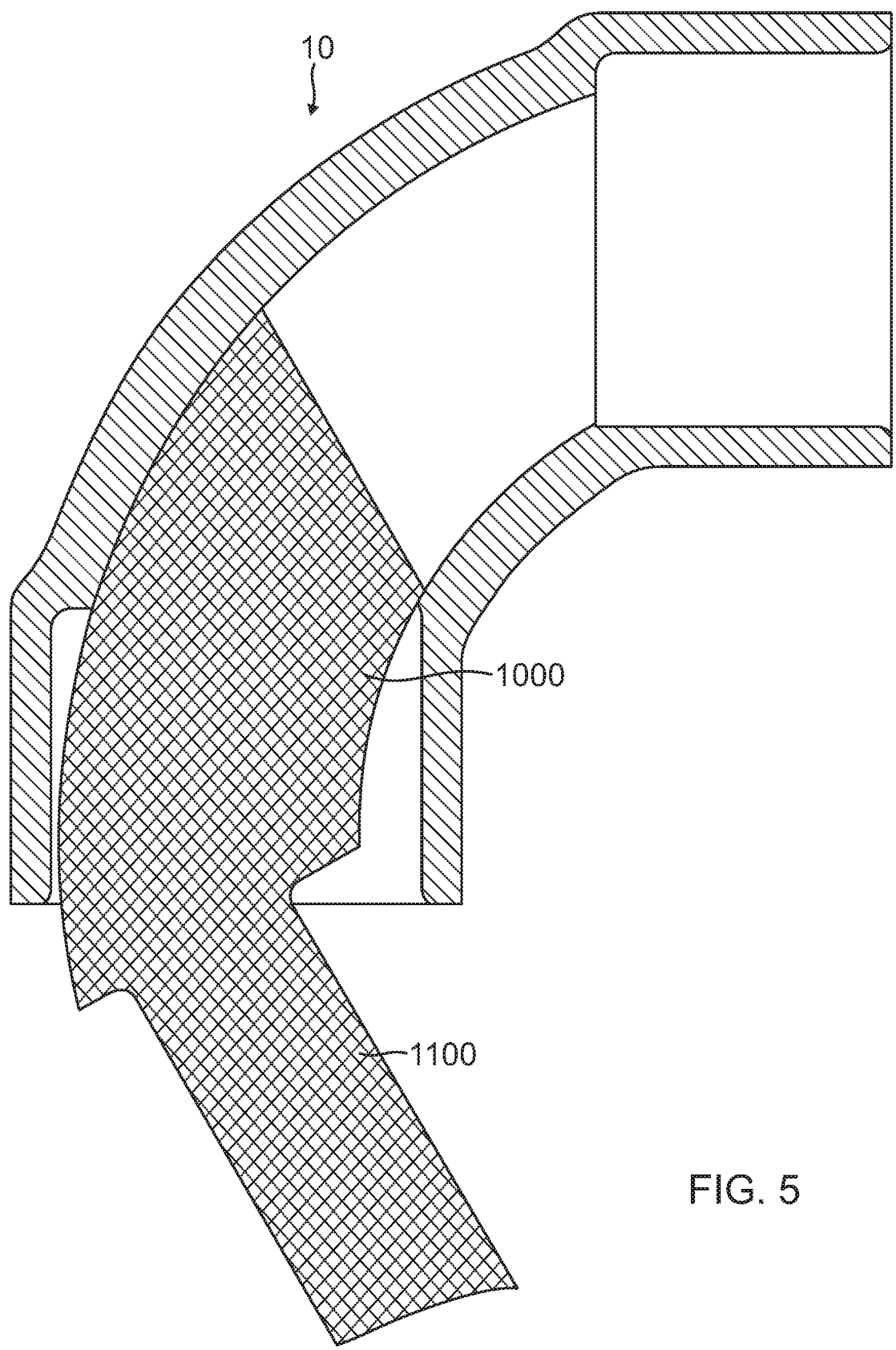
FIG. 5 is an interior longitudinal cross-sectional view of the present invention sweep elbow pipe connector with optimized flow path integrally formed at opposite ends with a first pipe connecting section and a second pipe connecting section, illustrating a molding core used to form the sweep elbow pipe connector.

Referring to FIG. 5, there is illustrated an interior longitudinal cross-sectional view of the arcuate sweep elbow pipe connector section 60 with optimized flow path, illustrating a molding core 1000 used to form the interior diameters of the arcuate sweep elbow pipe connector section as previously described.

The oval interior dimensions of the arcuate sweep elbow pipe connector section 60 are achieved by a core section 1000 having the approximate dimension of the longitudinal interior diameter and transverse interior diameter of the arcuate sweep elbow pipe connector section placed in the mold used to create the actuate sweep elbow pipe connector section 60. The core 1000 includes a handle 1100 so the core is pulled out of the mold, the arcuate sweep elbow pipe connector section after it has cooled.

In the design of fire sprinkler piping systems the measure used for friction loss of fittings used is "equivalent length". Fittings are tested for friction losses at velocities at or near expected field service. These test results are then equated to the distance of pipe the same size to generate the same loss. Equivalent feet are added to the distance of pipe used and a total pressure increase required is determined. Based on experimental testing, the present invention innovative arcuate sweep elbow pipe connector section decreases the equivalent length by a factor between two (2) and four (4) over prior art sharp corner elbow connections. The molded connecting sections and arcuate sweep elbow pipe connector section are molded out of PVC or CPVC plastic.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A pipe connector comprising:
   (a) a first connecting section, a second connecting section, and an elbow pipe connector section connecting the first connecting section and the second connecting section;
   (b) the first connecting section including a first interior connecting chamber having a tapered interior diameter (CDIA-1) at an entrance and a smaller diameter (CDIB-1) where connecting to the elbow pipe connector section, and an interior length (CIL-1);
   (c) the second connecting section including a second interior connecting chamber having a tapered interior diameter (CDIA-2) at an entrance and a smaller diameter (CDIB-2) where connecting to the elbow pipe connector, and an interior length (CIL-2);
   (d) the elbow pipe connector section integrally formed at one end with the first connecting section and integrally formed at a second end with the second connecting section, the elbow pipe connector section forming a sweep elbow and having an interior connecting chamber with a cross-sectional area greater than a water pipe cross-sectional area of a water pipe connected to either the first connecting section or the second connecting section,
   wherein the elbow pipe connector section is defined longitudinally by an inside arc (ARCI), an outside arc (ARCO) and a center arc (ENSWEFR-3) all of which share the same center point (POINTREF1),
   the inside arc (ARCI) is determined according to ARCI=SQRT(((CNFR-1)−(LLEN-2)+(CIL-2))+((CNFR-2)−((CDIB-2)/2))$^2$), and the outside arc (ARCO) is determined according to

ARCO=(((CDIA-2/2)−((CDIB-2/2))*(((CNFR-1)−(LLEN-2)+(CIL-2)).

2. The pipe connector in accordance with claim 1, wherein:
   (a) CIR-2=1.050 inches, CNFR-1=2.125 inches, LLEN-2=2.360 inches, CNFR-2=2.125 inches, and CDIB-2=1.310 inches ARCI=1.681 inches;
   (b) CDIA-2=1.325 inches, CIL-2=1.050 inches; and ARCO=2.786 inches;
   (c) ENSWER-3=2.270 inches and SWETD-1=1.293 inches;
   (d) with the interior diameter (CDIA-1) of approximately 1.325 inches, the smaller interior diameter (CD IB-1) is 1.310 inches and a leading wall thickness (TLD-I) is at least 0.133 inches, the chamber interior length (CIL-1) is approximately 1.05 inches; and
   (e) the second interior connecting chamber has a larger interior diameter and a smaller interior diameter, and a trailing wall thickness (TLD-2) of at least 0.133 inches.

3. The pipe connector in accordance with claim 2, wherein:
   the interior longitudinal direction diameter SWELD-1 is determined by SWELD-1=ARCO−ARCI.

4. The pipe connector in accordance with claim 1, wherein:
   (a) the inside arc is determined by a distance from two sweep centerpoints which include an intersection of the inside arc and a centerline edge of a truncated cone of the first connector section; and
   (b) the outside arc is determined by a distance from the two sweep centerpoints which include an intersection of a line through the inside arc and parallel to a second opening edge and the centerline edge of the second connector section.

5. The pipe connector in accordance with claim 4, wherein:
   (a) the elbow pipe connector section has a greater wall thickness than the wall thickness of each respective first and second connecting section to reduce the interior flow diameter from each first and second connecting section to the interior flow diameter of the elbow pipe connector section.

6. The pipe connector in accordance with claim 1, wherein:
   the first connecting section, the second connecting section, and the elbow pipe connector section are made of material selected from the group consisting of Poly Vinyl Chloride (PVC), Chlorinated Polyvinyl chloride (CPVC), High Density Polyethylene (HDPE), Cross-Linked Polyethylene (PEX), Polypropylene (PP), Poly Vinylidene Difluoride (PVDF), or Ethylene ChloroTri-FluoroEthylene (ECTFE).

7. The pipe connector in accordance with claim 6, wherein:
   the first connecting section, the second connecting section, and the elbow pipe connector section are injection molded.

8. The pipe connector in accordance with claim 1, wherein the interior connecting chamber comprises a noncircular interior chamber.

9. The pipe connector in accordance with claim 1, wherein the interior connecting chamber is oval.

10. The pipe connector in accordance with claim 1 wherein: the elbow pipe connector section has an interior diameter smaller than each respective interior diameter of the first and second connecting sections.

* * * * *